United States Patent [19]
Hineno et al.

[11] Patent Number: 5,701,287
[45] Date of Patent: Dec. 23, 1997

[54] OPTICAL HEAD WITH A PLURAL LAYERS COATED BEAM SPLITTER FOR LIGHT COMPONENTS SEPARATION

[75] Inventors: Satoshi Hineno, Kanagawa; Masaki Andoh, Tokyo, both of Japan

[73] Assignee: Sony Corporation, Tokyo, Japan

[21] Appl. No.: 651,373

[22] Filed: May 22, 1996

[30] Foreign Application Priority Data

May 25, 1995 [JP] Japan ................................. 7-150858

[51] Int. Cl.$^6$ .............................. G11B 7/00; G11B 7/135
[52] U.S. Cl. ........................... 369/110; 369/112; 369/13
[58] Field of Search ........................ 369/110, 112, 369/13, 44.12, 44.23, 44.24

[56] References Cited

U.S. PATENT DOCUMENTS

| | | | |
|---|---|---|---|
| 5,077,723 | 12/1991 | Yoshimatsu | 369/110 |
| 5,428,588 | 6/1995 | Ohuchida | 369/112 |
| 5,428,596 | 6/1995 | Hineno et al. | 369/110 |
| 5,523,994 | 6/1996 | Ando et al. | 369/112 |
| 5,528,575 | 6/1996 | Saito | 369/110 |
| 5,555,538 | 9/1996 | Yanagawa et al. | 369/110 |

*Primary Examiner*—David C. Nelms
*Assistant Examiner*—Kim-Kwok Chu
*Attorney, Agent, or Firm*—Limbach & Limbach L.L.P.

[57] ABSTRACT

An optical head comprising an object lens by which a light beam from a light source is projected so as to converge onto said magneto-optical recording medium, a beam splitter disposed along an optical path between the light source and the object lens, for separating the beam emitted from the light source and a first polarized light component or a second polarized light component different therefrom of a light beam returned from the signal surface of said magneto-optical recording medium via said object lens, and a photodetector for receiving the returned beam separated by the beam splitter, wherein the separation rate of the first component or second component by the beam splitter is not less than 85% and not more than 95%. This configuration enables the optical head to be small-sized, and the returned beam is detected with high precision.

6 Claims, 10 Drawing Sheets

OPTICAL HEAD WITH A PLURAL LAYERS COATED BEAM SPLITTER FOR LIGHT COMPONENTS SEPARATION

BACKGROUND OF THE INVENTION

1. Field of the Invention

This invention relates to an optical head, in particular, an optical head for recording and/or reproducing information on an optical recording medium such as a magneto-optical recording medium.

2. Description of the Related Art

FIG. 8 shows a configuration of a conventional optical head for recording and/or reproducing information on an optical recording medium. In FIG. 8, an optical head 1 comprises a semiconductor laser element 2 as a light source, a grating 3, a collimator lens 4, a beam splitter 5, an object lens 6, a Wollaston polarizing prism 7 disposed along an optical path of a light beam returned from the recording medium (the beam being separated by the beam splitter 5), a collective lens 8, a multilens unit 9, and a photodetector 10 having plural photoreception surfaces.

A laser beam emitted from the semiconductor laser element 2 including p-polarized light, is separated into, for example, three light beams by the grating 3. The p-polarized light is, namely, a polarizing component which oscillates within a plane comprising incident light and reflected light or emitted light, in connection with the beam splitter 5. Then the separated beams are converted by the collimator lens 4 into parallel beams, which pass through the beam splitter 5. Successively, the beams are guided through the object lens 6 to converge on the signal recording surface of a magneto-optical disk as denoted by D.

The returned beam including a magneto-optical signal having a component of s-polarized light (polarized light that oscillates within a plane perpendicular to the polarization plane of the p-polarized light) is incident again on the beam splitter 5 via the object lens 6. The magneto-optical signal is generated such that the converging beam is reflected on the signal recording surface of the magneto-optical disk D, and its polarization plane is rotated based on Kerr effects. In the beam splitter 5, the returned beam is reflected on the half mirror plane 5a so as to be deflected at 90°, and the deflected beam is totally reflected on an inner side 5b so as to be deflected at 90° again. In accordance with the beam emitted from the beam splitter 5, the Wollaston polarizing prism 7 emits plural light beams by its birefringence, and the plural beams pass through both the collective lens 8 and the multi-lens unit 9 to converge on respective photoreception surfaces of the photodetector 10. Thereby, signals are generated such that a read signal as called a magneto-optical signal, a focussing error signal, and a tracking error signal are generated in accordance with detection signals from the respective photoreception surfaces of the photodetector 10.

In the configuration shown in FIG. 8, the beam splitter 5 is disposed on a parallel optical path of a parallel beam converted from the divergent beam emitted from the semiconductor laser element 2 by the collimator lens 4. By this arrangement of the beam splitter 5 disposed in the parallel optical system, a path of the beam directed to the magneto-optical disk D, and a path of the beam directed to the photodetector 10 as reflected by the disk D are separated in the parallel beam. The arrangement enables an angle of the beam incident on the beam splitter 5 to be constant, thus the incident-angle-dependency of the beam splitter 5 does not matter.

However, the arrangement requires that the divergent beam emitted from the semiconductor laser element 2 is incident on the collimator lens 4 after the beam has diverged for a predetermined amount, accordingly, the distance between the laser element 2 and the collimator lens 4 must be relatively long. As a result, also the distance between the laser element 2 and the object lens 6 becomes long to raise the problem that the whole optical head 1 becomes large-sized.

To solve the problem, as disclosed in, for example, U.S. Pat. No. 5,428,596, there is known an optical pickup 11 having a configuration as shown in FIG. 9. In FIG. 9, the optical head 11 comprises a semiconductor laser element 12 as a light source, a grating 13, a beam splitter 14, a collimator lens 15, an object lens 16, a Wollaston polarizing prism 17 disposed along an optical path of a returned light beam separated by the beam splitter 14, a multi-lens unit 18, and a photodetector 19 having plural photoreception surfaces.

A laser beam including p-polarized light, emitted from the laser element 12 is separated into three light beams by the grating 13, and the beams pass through the beam splitter 14. Successively, the beams are converted into parallel beams by the collimator lens 14 to converge onto the signal recording surface of a magneto-optical disk denoted by D via the object lens 16. The returned beam is incident on the beam splitter 14, passing through the object lens 16 and the collimator lens 15 again, the returned beam being an s-polarized light component-included light beam which is generated such that the converging beam is reflected by the magneto-optical disk D, and the polarization plane is rotated based on Kerr effects. In the beam splitter 14, the returned beam is reflected on the half mirror plane 14a thereof so as to be reflected at 90°. Successively, in accordance with the beam emitted from the beam splitter 14, the Wollaston polarizing prism 17 emits plural light beams to converge on the respective photoreception surfaces of the photodetector 19 via the multi-lens unit 18.

In the configuration of the optical head 11 as shown in FIG. 9, the beam splitter 14 is disposed between the semiconductor laser element 12 and the collimator lens 15, thus the beam emitted from the beam passes in diverging through the beam splitter 14 to be incident on the collimator lens 15, by which the beam is converted into a parallel beam. On the other hand, the returned beam which is reflected from the magneto-optical disk D is converted into a convergent beam, and the convergent beam is incident on the beam splitter 14, in which the convergent beam is reflected on the half mirror plane 14a so as to be deflected to the photodetector 19. In accordance with the configuration of the optical head as shown in FIG. 9, as compared with the optical head as shown in FIG. 8, the beam splitter 14 is disposed along an optical path between the laser element 12 and the collimator lens 15, whereby the distance between the laser element 12 and the collimator lens 15 is effectively used to enable shortening the distance between the laser element 12 and the object lens 16, so that the whole optical head 11 becomes small-sized.

Actually, in the optical head 11 having the above-described configuration, because the beam reflected on the half mirror plane 14a of the beam splitter 14 is a convergent beam, there is provided the beam splitter 14 having plural layers based on the incident-angle-dependency of plural layers forming the half mirror plane 14a. The plural layers are designed for the transmittance of p-polarized light, Tp=65%; the reflectance of p-polarized light, Rp=33%; the transmittance of s-polarized light, Ts=33%; and the reflectance of s-polarized light, Rs=65%. However, when the beam splitter 14 as described above is used, the signal level of the s-polarized light component as a magneto-optical reproduction signal becomes low, which thus raises the problem that the magneto-optical reproduction signal cannot be sufficiently detected depending on the characteristics of the beam emitted from the laser element 12.

SUMMARY OF THE INVENTION

Object of the Invention

It is an object of the present invention to provide an optical head for magneto-optical recording media, being small-sized, and capable of detecting a light beam returned from the medium with high precision.

Brief Summary of the Invention

In accordance with the present invention, there is provided an optical head comprising:

a light source for emitting a light beam;

an object lens by which the beam from the light source is projected so as to converge onto the signal recording surface of a magneto-optical recording medium;

a beam splitter disposed along an optical path between the light source and the object lens, for separating the beam as a divergent beam emitted from the light source, and a first polarized light component or a second polarized light component of a convergent light beam returned from the signal recording surface of the magneto-optical recording medium, via the object lens; and a photodetector for receiving the returned beam separated by the beam splitter, wherein the separation rate of the first component or the second component by the beam splitter is not less than 85% and not more than 95%.

In accordance with the configuration of the optical head of the present invention, the beam returned from the signal recording surface of the magneto-optical recording medium is incident on the beam splitter, by which the second polarized light component is reflected or the first polarized light component is transmitted so that the second or first component can be separated, and the separated second or first component is incident on the photodetector. Thereby, a reproduction signal or a servo-error signal is detected by the photodetector.

In this case, the first polarized light component is, for example, a p-polarized light component, and the second polarized component is an s-polarized light component, accordingly, the s-polarized component or the p-polarized component mixed in the reproduction signal of a p-polarized or s-polarized light component is reflected or transmitted by the beam splitter to be separated, and the separation rate is in the range of 85 to 95%, whereby high quality reproduction signal is generated, and the signal is detected with high precision.

In the case that the separation rate, namely, the reflectance of the s-polarized light component in an optical path for separating the p-polarized light component, or the transmittance of the s-polarized light component in an optical path for separating the s-polarized light component, is less than 85%, the quality of the reproduction signal is not so high, so that the precision of the signal becomes low.

On the other hand, in the case that the separation rate, namely, the reflectance in the optical path for separating the p-polarized light component, or the transmittance in the optical path for separating the s-polarized light component, is more than 95%, the influence of birefringence in the recording medium increases noise in the reproduction signal to deteriorate the quality of the signal.

DESCRIPTION OF THE PREFERRED EMBODIMENTS

Preferred embodiments according to the present invention will be described below, referring to FIG. 1 to FIG. 7.

The following embodiments are preferred examples of the present invention, thus technically preferred limitations are added to the invention, however, the scope of the invention is not limited to the embodiments unless there is mention to limit the invention in the following description.

Figure 1:
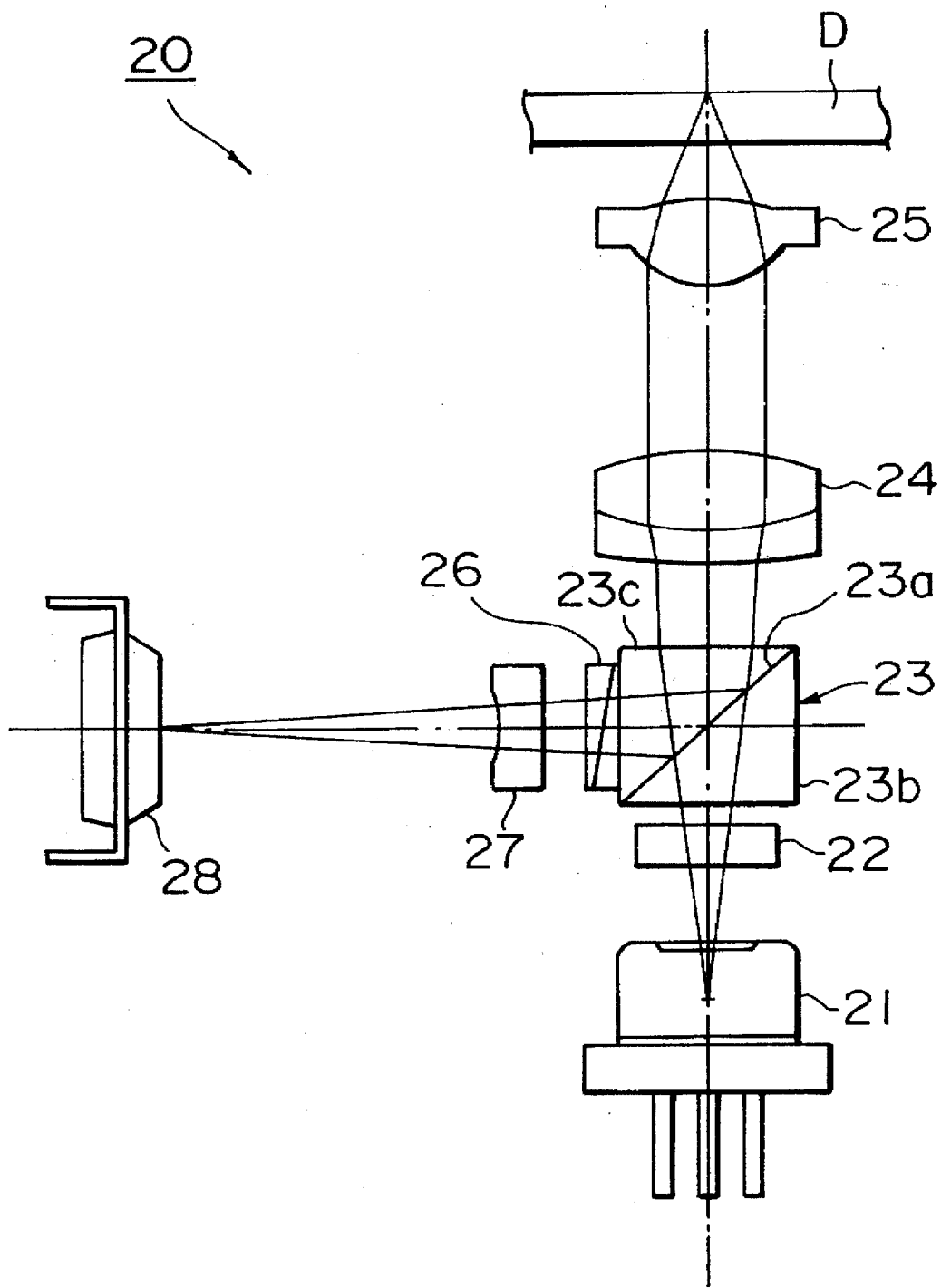
FIG. 1 is a schematic side view illustrating the configuration of an optical head according to the first embodiment of the present invention.

FIG. 1 illustrates the first embodiment of the optical head according to the present invention.

In FIG. 1, an optical head 20 comprises a semiconductor laser element 21, a grating 22, a beam splitter 23, a collimator lens 24, an object lens 25, a Wollaston polarizing prism 26 on which a returned beam separated by the beam splitter 23 is incident, a multi-lens unit 27, and a photodetector 28.

The semiconductor laser element 21 is a light emitting element using recombination radiation of a semiconductor, and is used as a laser beam source. A light beam emitted from the laser element 21 is directed to the grating 22.

The grating 22 diffracts an incident light, thus it is used to diffract the beam emitted from the laser element 21 to be separated into at least three light beams of a diffracted light beam of zero order and diffracted light beams of ±1st side order, in a direction perpendicular to the direction of tracking. The diffracted beams of ±1st side order are utilized to generate a tracking error signal.

The beam splitter 23 comprises two glass blocks stuck to each other, the contact plane of surfaces of the glass blocks functions as a half mirror plane 23a. The half mirror plane 23a is provided at an incline of 45° with respect to the optical axis so as to separate the beam from the laser element 21 and the returned beam from the signal recording surface of a magneto-optical disk D. Therefore, the beam splitter 23 is disposed along the optical path between the laser element 21 and the collimator lens 24.

The collimator lens 24 as a convex lens converts the divergent beam from the laser element 21 into a parallel beam.

The object lens 25 transmits the parallel beam from the collimator lens 24 to converge onto a target track of the signal recording surface of the magneto-optical disk D rotated. The object lens 25 is moved in accordance with a servo signal as mentioned later so that the parallel beam can converge onto the target track.

The beam converging on the signal recording surface of the magneto-optical disk D is returned from the surface, the returned beam is guided into the beam splitter 23 via the object lens 25 and the collimator lens 24. Then the returned beam reflected on the reflection plane 23a of the beam splitter 23 is incident on the photoreceptor of the photodetector 28 via the Wollaston polarizing prism 26 and the multi-lens unit 27.

The Wollaston polarizing prism 26 polarizes the returned beam reflected from the reflection plane to be separated based on the polarization characteristics thereof, so that separated plural beams are emitted.

The multi-lens unit 27 as a concave lens unit by which the separated plural beams are projected to converge on the respective photoreceptors of the photodetector.

The photodetector 28 has the plural photoreceptors for receiving the respective beams separated by the beam splitter 23 and the Wollaston polarizing prism 26.

The above described configuration is the same as that of the conventional optical head, however, the optical head 20 in the first embodiment includes the beam splitter 23 in which the half mirror plane 23a thereof comprises the plural layers designed such that the reflectance of the s-polarized light component of the incident light, Rs, is in the range of not less than 85% and not more than 95%.

Figure 2:
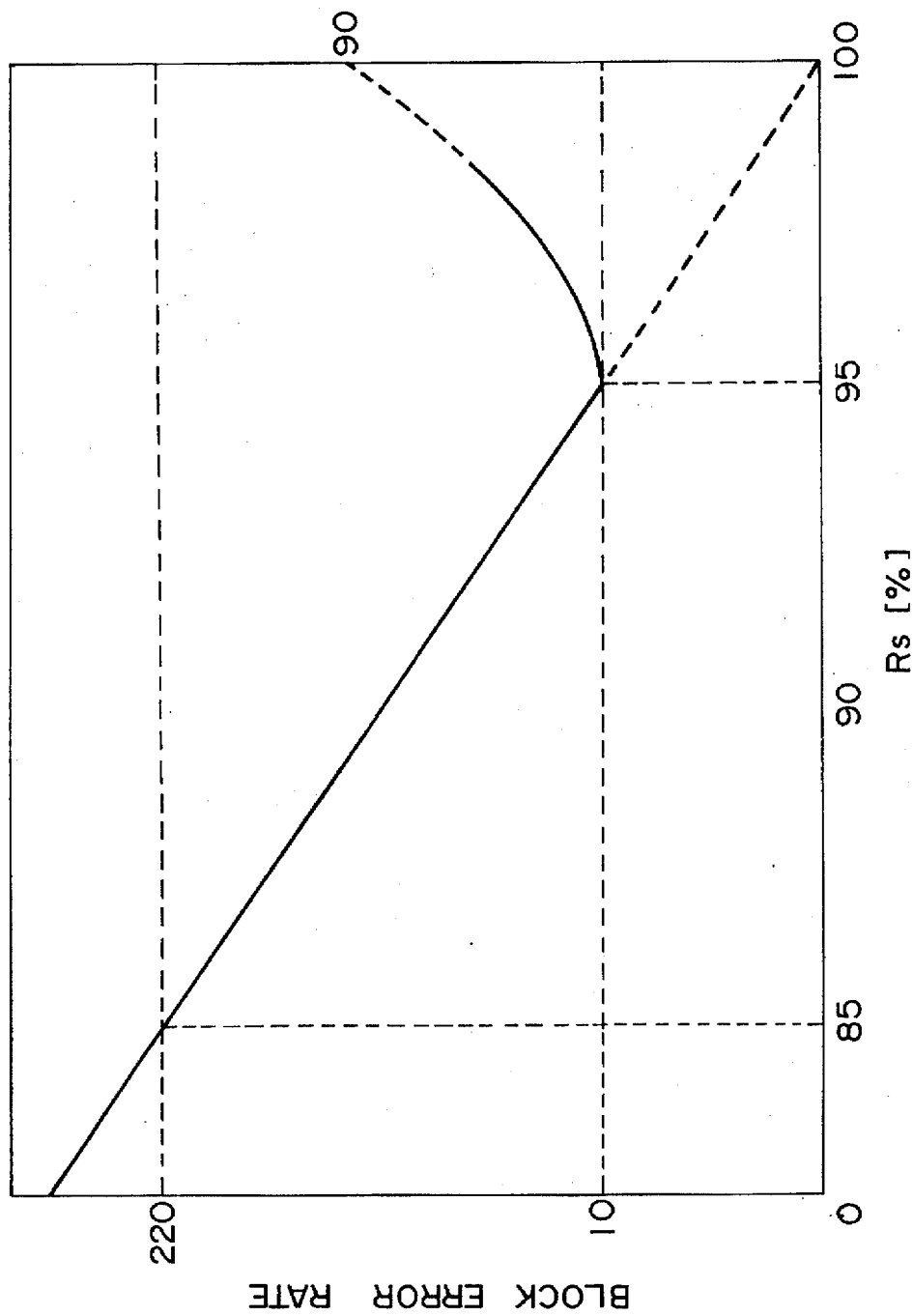
FIG. 2 is a graph showing a relation between the reflectance of an s-polarized light component by a beam splitter in the optical head shown in FIG. 1 and the block error rate in a reproduction signal.

In this case, when the reflectance of the s-polarized light component, Rs, is less than 85%, the level of the reproduction signal decreases, thus lowering its quality and deteriorating its precision, so that the block error rate becomes relatively greater, as shown in FIG. 2. On the other hand, when the reflectance of the s-polarized light component, Rs, is more than 95%, the influence of birefringence of the magneto-optical disk D increases noise in the reproduction signal deteriorating the quality of the reproduction signal, so that the block error rate becomes greater, likewise as shown in FIG. 2.

The plural layers are formed by successively forming, for example, a titanium oxide layer ($TiO_2$) being 49.19 nm thick, a silicon oxide ($SiO_2$) layer being 287.55 nm thick, a silicone layer (Si) being 44.29 nm thick, and a chromium (Cr) layer being 4.00 nm thick, on the surface of one of the glass blocks, 23b, and on the plural layers is stuck to the other glass block 23c.

Figure 3:
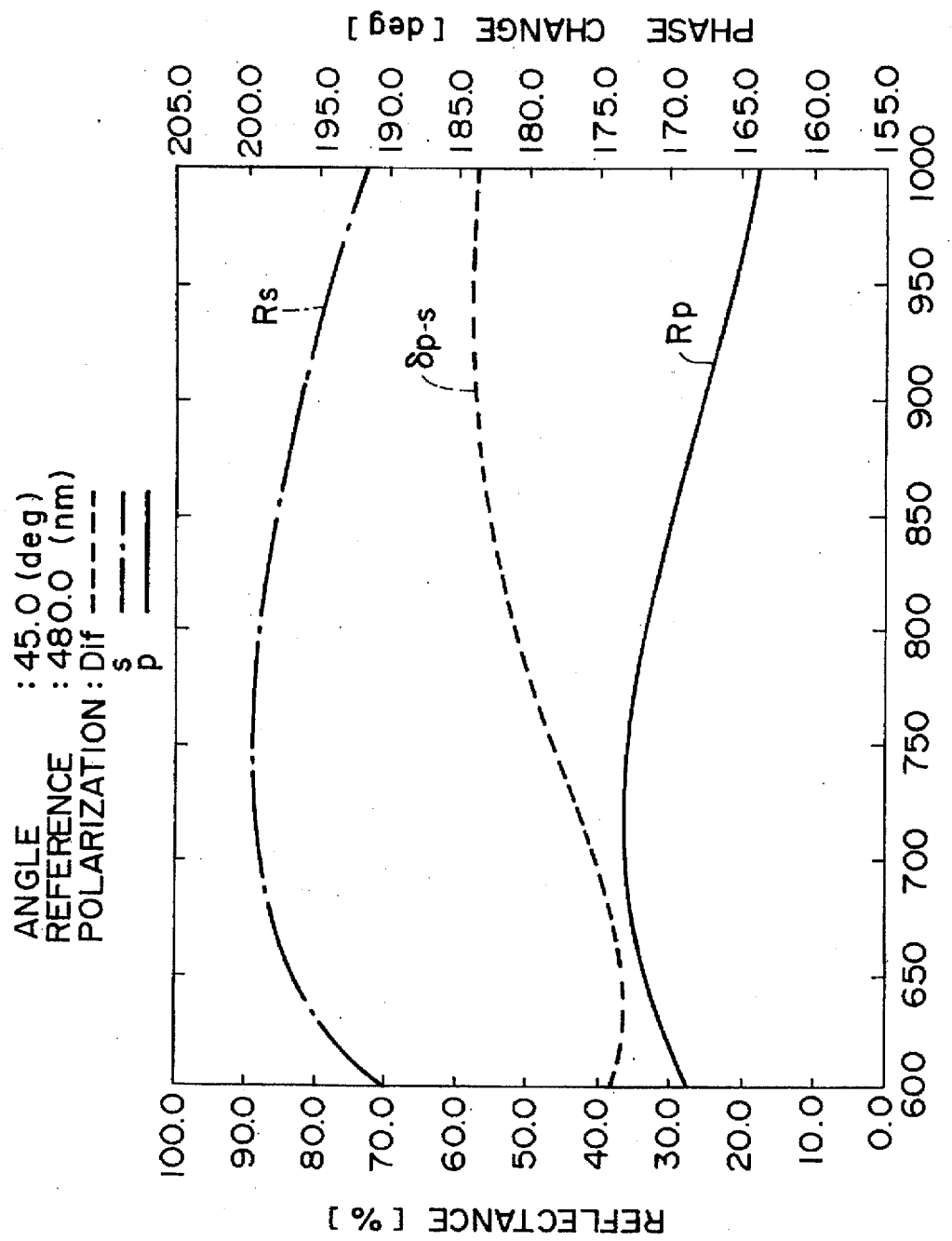
FIG. 3 is a graph showing reflectances and phase changes with respect to the wavelengths of light incident on the beam splitter of the optical head as shown in FIG. 1.

FIG. 3 shows the reflectance ($R_s$ & $R_p$), and the phase change ($\delta_{p-s}$) with respect to wave length for a light beam incident at 45° on the plural layers.

Figure 4:
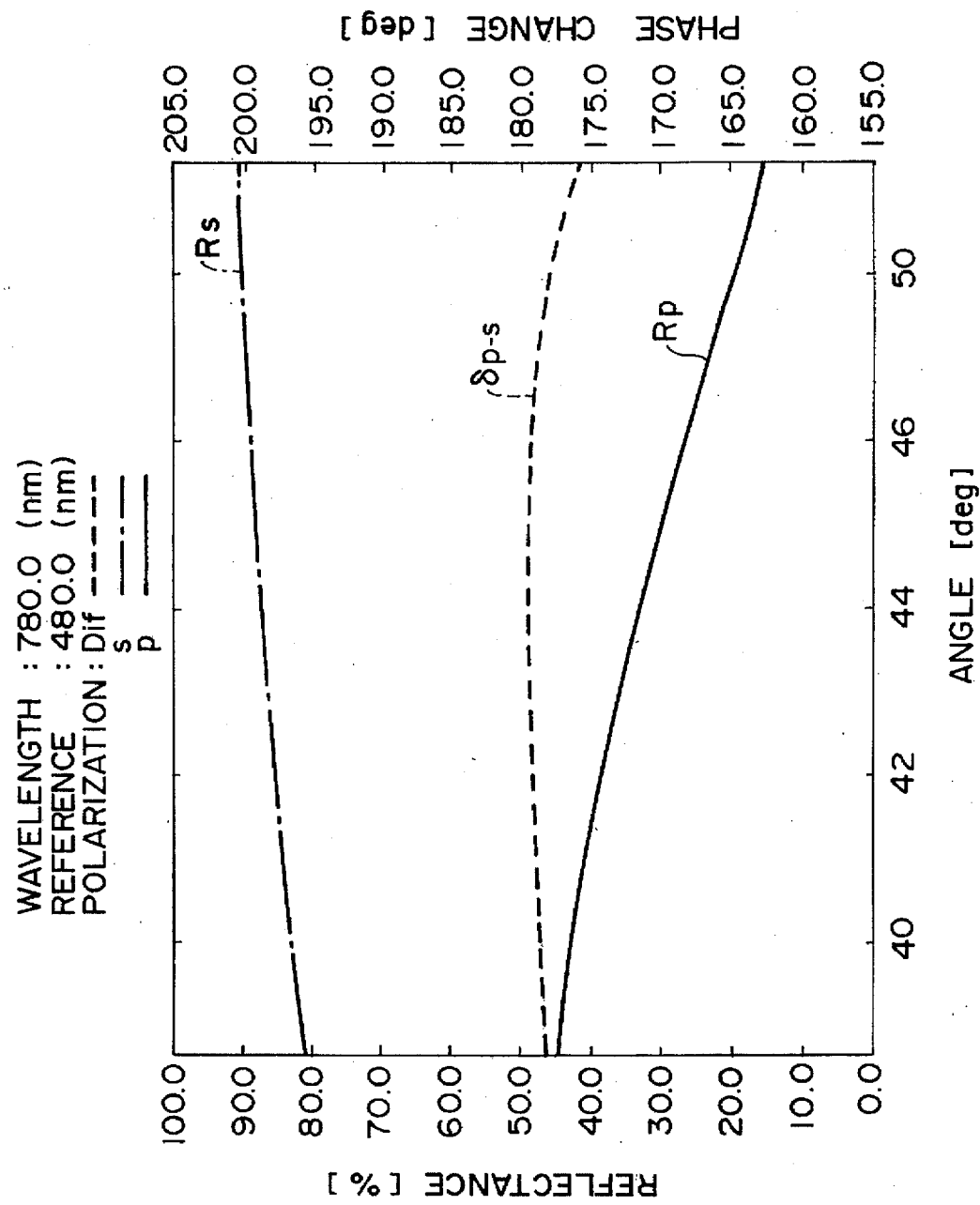
FIG. 4 is a graph showing reflectances and phase changes with respect to angles of incident light on the beam splitter of the optical head as shown in FIG. 1.

FIG. 4 shows the reflectance ($R_s$ & $R_p$), and the phase change ($\delta_{p-s}$) with respect to angles of incidence (45±7° converted to ±10.5° in air) for a 780.0 nm light beam incident on the plural layers.

Therefore, in spectral characteristics in the optical path of convergent light, for example, in the characteristics in the range of ±8°, the transmittance of the p-polarized light component as the first polarized light component, Tp=65%, and the reflectance of the p-polarized light component, Rp=30%, thus, the transmittance of the s-polarized light component as the second polarized light component, Ts<10%, and the reflectance of the p-polarized light component, Rs>>85%.

The optical head 20 in the first embodiment has the above-described configuration that the laser beam of p-polarized light component emitted from the semiconductor laser element 21 is separated by the grating 22 into the three light beams, which pass through the beam splitter 23.

Then, the beams are converted by the collimator lens 24 into the parallel beams incident on the object lens 25, by which the beams are projected so as to converge onto the signal recording surface of the magneto-optical disk D.

The returned beam including a magneto-optical signal of the s-polarized light component is incident again on the beam splitter 23 via the object lens 25 and the collimator lens 24. The magneto-optical signal are generated such that the converging beam is reflected on the signal recording surface of the magneto-optical disk D, and its polarization plane is rotated based on Kerr effects. In the beam splitter 23, the p-polarized light component of the returned beam is transmitted and the s-polarized light component is reflected by the plural layers formed on the half mirror plane 23a.

Then, the reflectance of the s-polarized light component by the half mirror plane 23a, Rs, is in the following range:

$$85\% << Rs << 95\%,$$

therefore, the returned beam reflected on the half mirror plane 23a of the beam splitter 23 becomes relatively high in its signal level, and the magneto-optical signal is enhanced based on the following equation:

$$\text{Enhancement Rate} = \sqrt{(Rs/Rp)}.$$

Successively, the s-polarized light component reflected on the half mirror plane 23a of the beam splitter 23 is polarized by the Wollaston polarizing prism 26 to be separated into the three light beams, namely, the p-polarized light component, the s-polarized light component, and the servo-component. The three respective beams are incident on the multi-lens unit 27 by which the focussing error component of the beams is magnified, and the beams pass through the multi-lens unit are incident on the respective photoreceptors of the photodetector 28. Thereby, in accordance with detection signals from the respective photoreceptors of the photodetector 28, the magneto-optical signal, the focussing error signal, and the servo-signal of the tracking error signal are generated.

Figure 10:
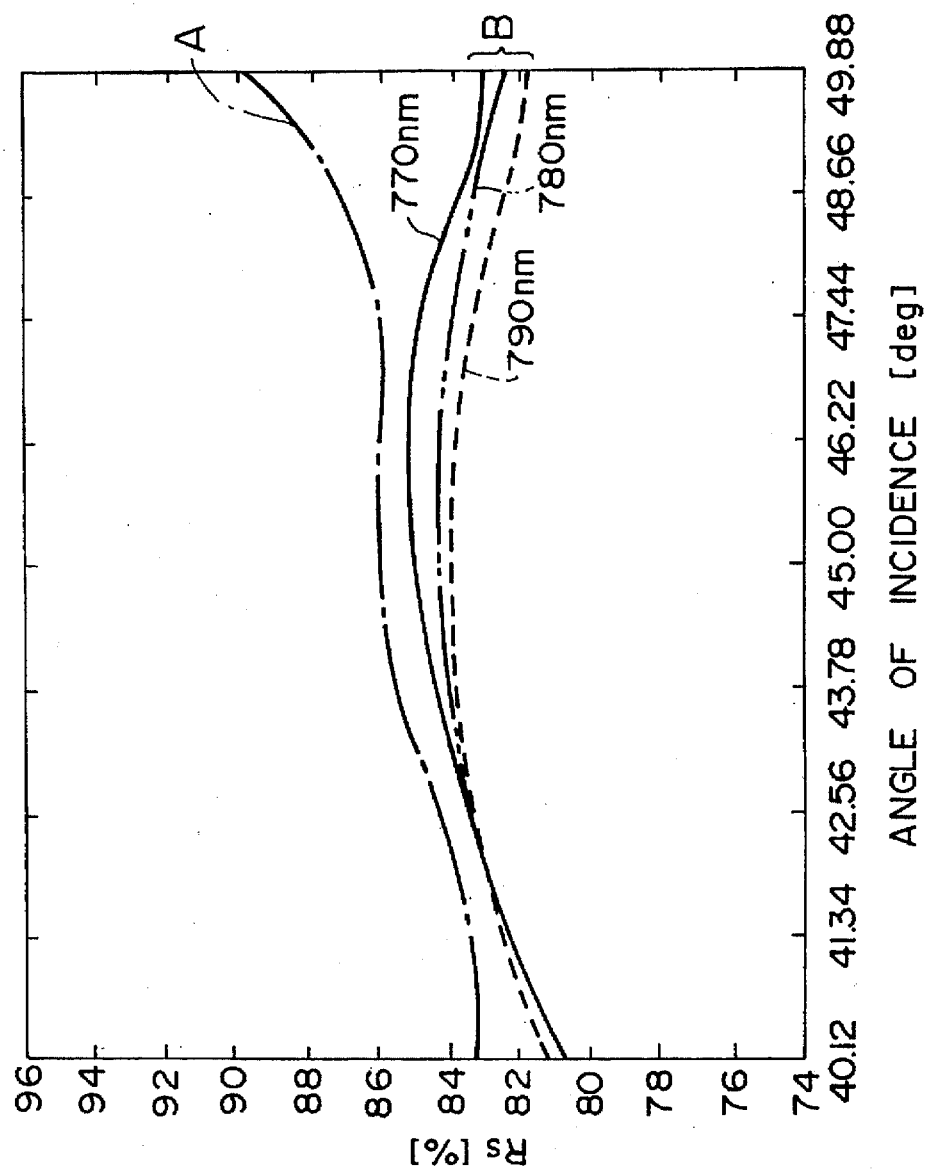
FIG. 10 is a graph showing a relation between the reflectance of a p-polarized light by plural layers in the beam splitter and the angles of light incident on the layers.

In such a case, because the plural layers of the half mirror plane 23a in the beam splitter 23 has the above-described configuration as shown in FIG. 10, the reflectance of the s-polarized light component, Rs, denoted by the line B becomes stable and improved as shown in FIG. 10, compared with the reflectance denoted by the line A (solid line) showing great change. The reason why there are three lines of the reflectance denoted by B is that the lines show the cases of using beams of different wavelengths. As also shown by these lines, the Rs does not greatly change depending on the angle of incidence.

Figure 11:
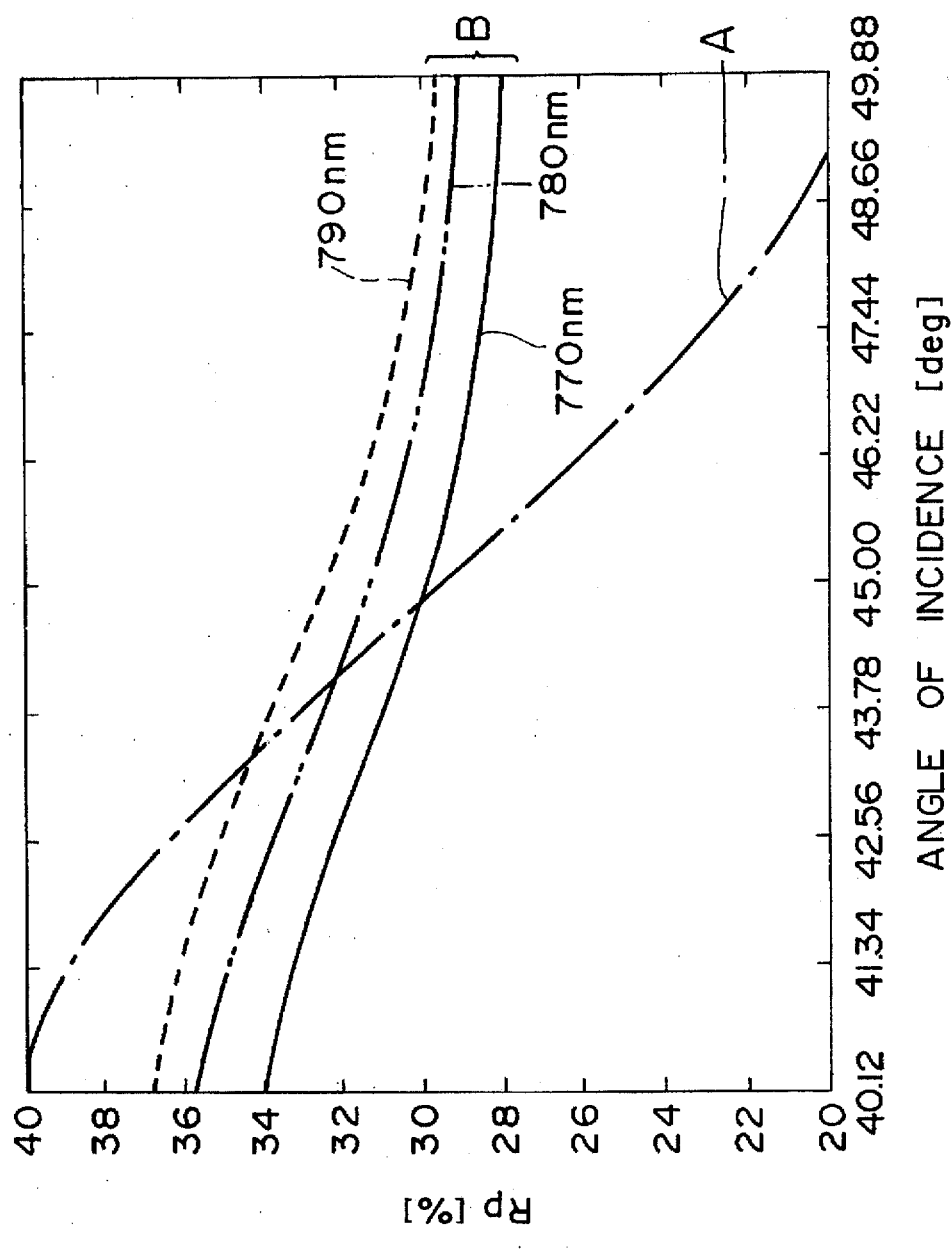
FIG. 11 is a graph showing a relation between the reflectance of the p-polarized light reflected by plural layers in the beam splitter and the angles of light incident on the layers.

As to the reflectance of the p-polarized light component, Rp, as denoted by the line B, the change of the Rp in the first embodiment is reduced with respect to the angle of incidence, in other words, the incident-angle-dependency is reduced, thus the Rp does not show great change, as shown by the line B, compared with the Rp in the conventional beam splitter, denoted by the line A in FIG. 11.

Further, the parallel optical system lies between the collimator lens 24 and the object lens 25, and no other optical element like the beam splitter and so forth is disposed therebetween, thus the whole optical system can be arranged in a small size. The reason why there are three lines of the reflectance Rp denoted by B is that the lines show the cases of using beams of different wavelengths. As also shown by these lines, the Rp does not greatly change depending on the angle of incidence.

Figure 5:
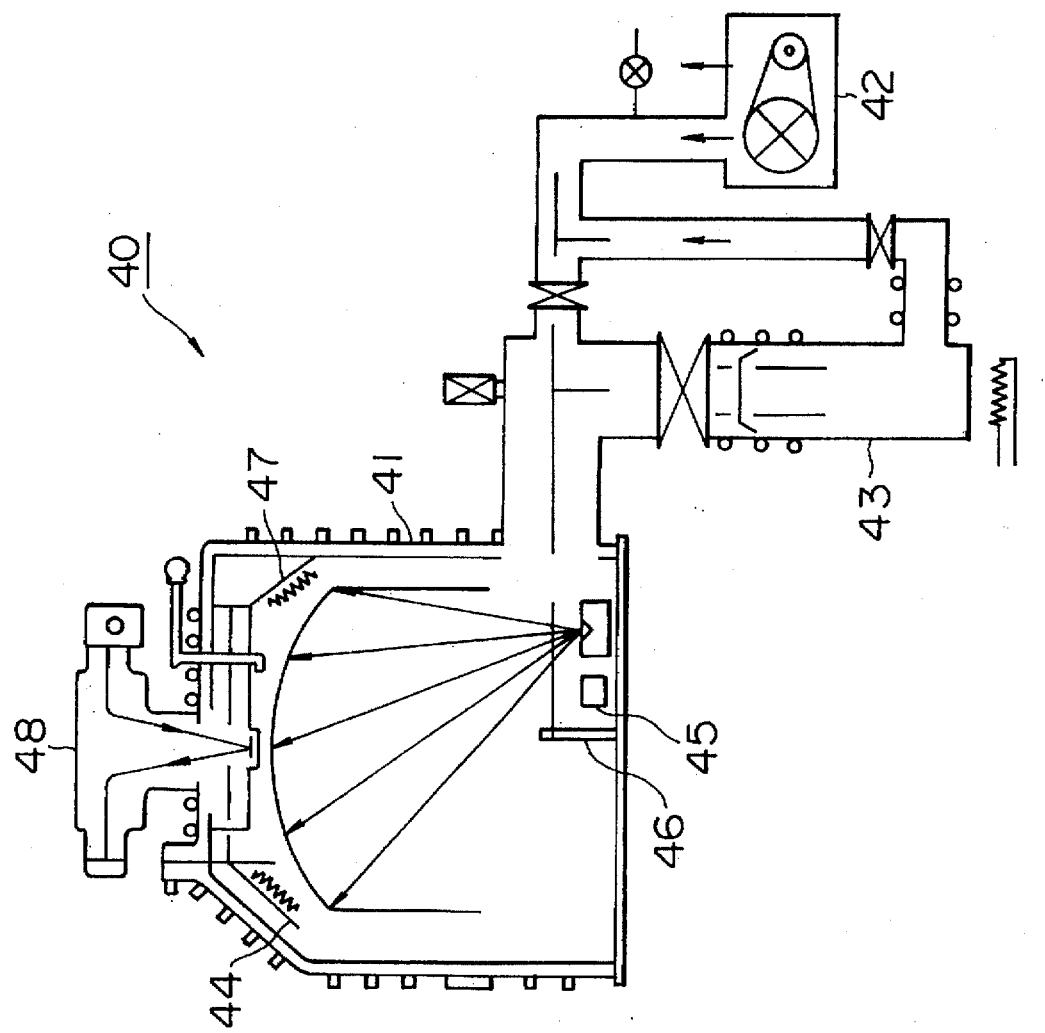
FIG. 5 is a schematic section view illustrating a configuration of an apparatus for producing the beam splitter in the optical head as shown in FIG. 1.

The plural layers of the half mirror plane 23a in the beam splitter 23 are formed by, for example, a vapor deposition system 40 as shown in FIG. 5.

In FIG. 5, the vapor deposition system 40 comprises a deposition chamber 41, a rough vacuum pump 42 and a high vacuum pump 43 both connected to the deposition chamber 41, a substrate holder 44 provided inside the deposition chamber 41, a deposition material container 45 provided in the lower part of the deposition chamber 41, a shutter 46 for shutting the deposition material container 45, a heater 47, and a film thickness gage 48.

The deposition chamber 41 is formed so as to be closed to outside air.

As the rough vacuum pump 42, for example, a rotary pump, a mechanical booster pump, or the like is used.

As the high vacuum pump 43, for example, an oil diffusion pump, a turbo-molecular pump, a cryopump, or the like is used.

Thereby, the deposition chamber 41 is exhausted to a predetermined start atmospheric pressure as a degree of vacuum by the rough vacuum pump 42 and the high vacuum pump 43.

The substrate holder 44 has a dome-shaped surface, on which there are provided mounts for mounting plural substrates. In this case, the substrates are the glass block 23b forming the beam splitter 23.

As the deposition material container 45, for example, a crucible made of molybdenum is used, into which the deposition material in powder, pellets, or granules is put, and the material is heated by, for example, resistance heating method or electron beam heating method. When the deposition material has a high melting point of, for example, 2000° C., the electron beam heating method is used to heat the material.

The shutter 46 opens or shuts the deposition material container 45. Shutting the container 45 prevents the deposition material from being spread inside the deposition chamber 44.

The heater 47 is provided in the upper part of the inside of the deposition chamber 41, and is used to heat the substrate mounted on the substrate holder 44.

The film thickness gage 48 is used to measure a thickness of the deposited layer formed on the substrate mounted on the substrate holder 44. As the film thickness gage 48, for example, an optical film thickness gage, or a crystal film thickness gage is used.

In accordance with the vapor deposition system having the above configuration, the glass block 23b of the beam splitter 23 on which the plural layers are deposited is cleaned before mounted on the mount of the substrate holder 44, and the substrate holder 44 is provided inside the deposition chamber 41. Successively, the air in the deposition chamber 41 is exhausted to a low vacuum by the rough vacuum pump 42, further exhausted to the predetermined start atmospheric pressure by the high vacuum pump 43.

In this condition, the deposition material in the deposition material container 45 is heated. When the material is heated to a temperature required for a target deposition rate, the shutter 45 is open, whereby a film of the deposition material is deposited on the surface of the glass block mounted on the substrate holder 44.

Further, a thickness of the film of the deposition material is measured by the film thickness gage 48. When the thickness reaches a predetermined thickness, the shutter 45 is shut.

Finally, the heater 47 is turned off, and heating the deposition material container 45 is interrupted. After the deposition material in the container 45 is cooled, the deposition chamber 41 is open to air, and then the substrate holder 44 is taken out from the deposition chamber 41. Thereby, one layer of the deposition material is deposited on the glass block 23b.

Such a process is repeated to form the plural layers on the surface of the glass block 23b forming the beam splitter 23.

Further, in order to make the refractive index of the plural layers, after-treatment like annealing may be conducted as to the glass block 23b.

In accordance with the above manner, it is possible to produce the beam splitter having the optical characteristics as shown in the first embodiment.

Figure 6:
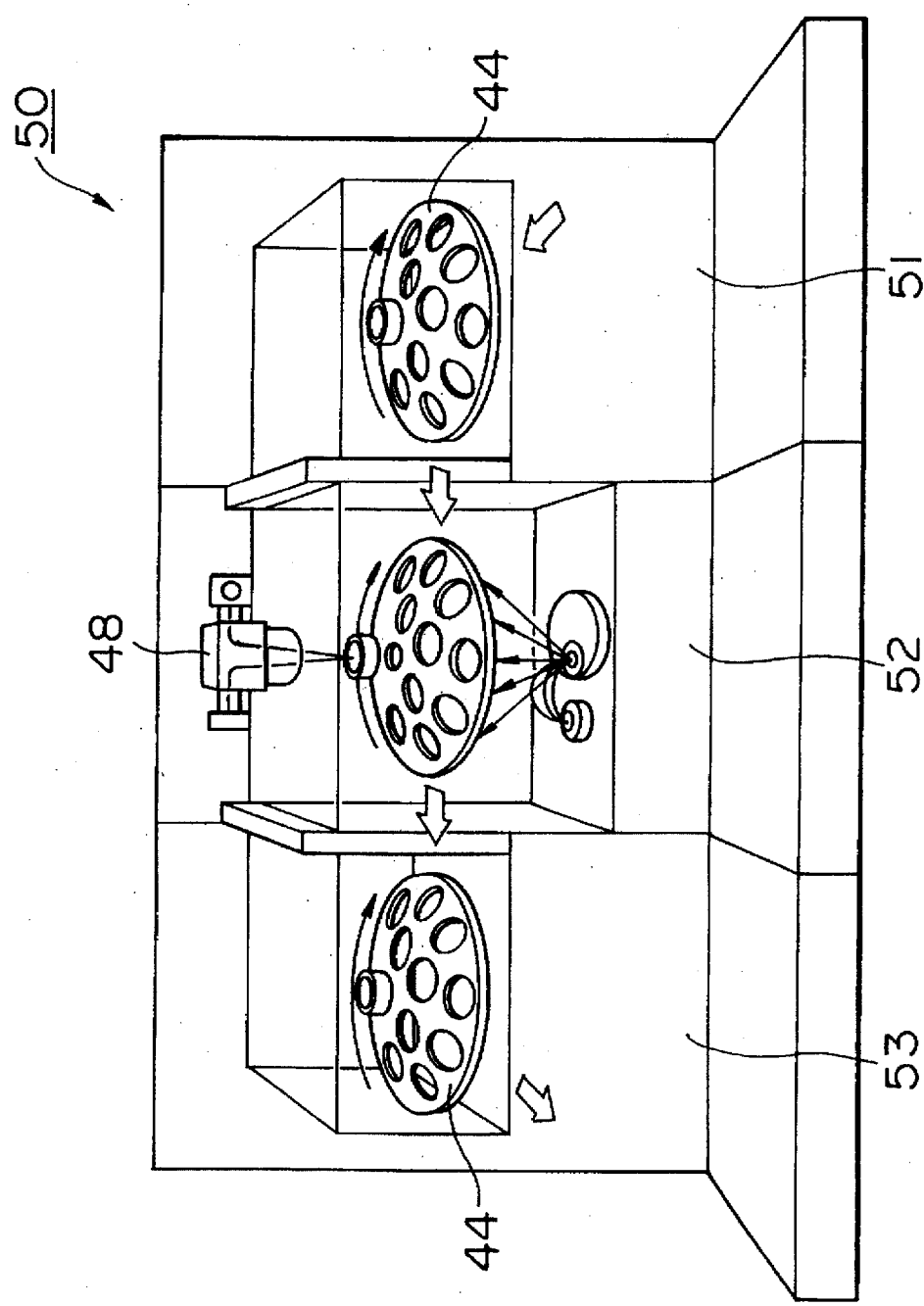
FIG. 6 is a schematic perspective view illustrating another configuration of the apparatus for producing the beam splitter in the optical head as shown in FIG. 1.

Further, as the deposition system, a continuous deposition system is also used as shown in FIG. 6.

In FIG. 6, a continuous deposition system 50 comprises three deposition chambers exhausted to a predetermined atmospheric pressure as a degree of vacuum, namely, a supply chamber 51 in which a substrate holder 44 is inserted, a deposition chamber 52 in which deposition is done, and an ejection chamber 53 from which the substrate holder 44 is taken out. The deposition chamber 52 does not need to be exhausted each time the substrate holder is taken in or off, thus plural substrates mounted on the substrate holder 44 are continuously deposited in short time. The deposition chamber 52 has the same configuration as the deposition system 40 as shown in FIG. 5, and has a film thickness gage 48 on the top of the chamber. By the film thickness gage, it is possible to measure the thickness of the film formed on the surface of the glass block 23b mounted on the substrate holder 44 in the deposition chamber 52.

Figure 7:
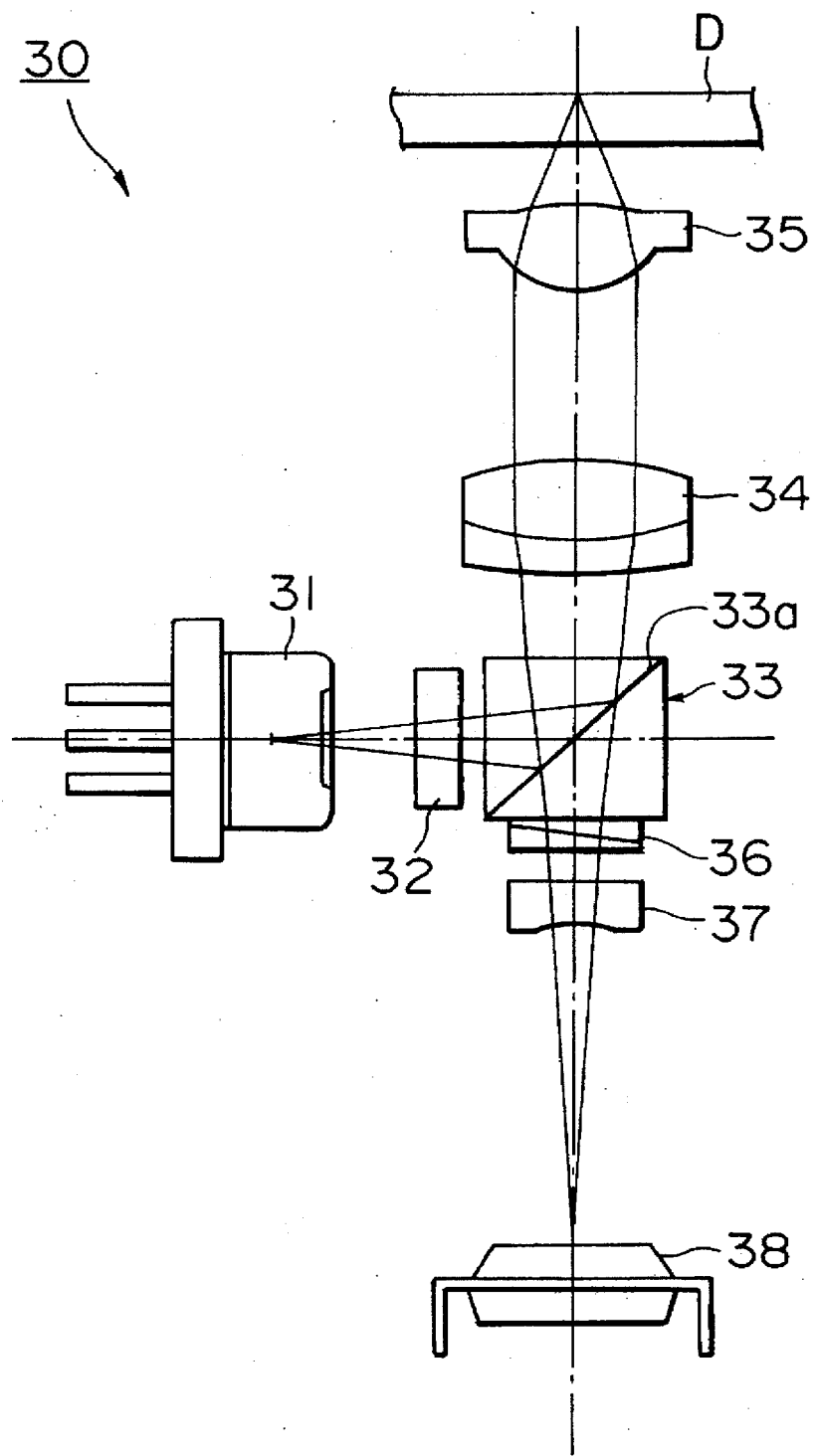
FIG. 7 is a schematic side view illustrating the configuration of an optical head according to the second embodiment of the present invention.
Figure 8:
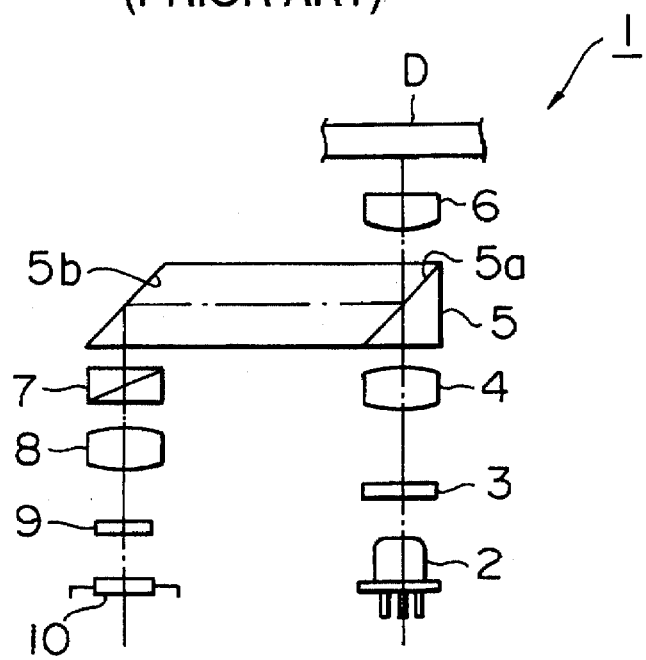
FIG. 8 is a schematic side view illustrating a configuration of a conventional optical head in which p-polarized light is separated from incident light.
Figure 9:
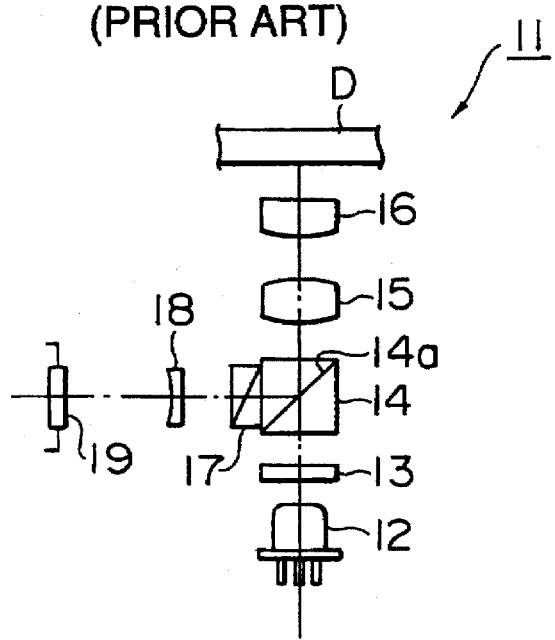
FIG. 9 is a schematic side view illustrating a configuration of a conventional optical head in which s-polarized light is separated from incident light.

In FIG. 7, there is shown an optical head as the second embodiment of the present invention.

In FIG. 7, an optical head 30 comprises a semiconductor laser element 31, a grating 32, a beam splitter 33, a collimator lens 34, an object lens 35, a Wollaston polarizing prism 36 on which the returned beam separated by the beam splitter 33 is incident, a multi-lens unit 37, and a photodetector 38.

The above configuration is substantially the same as that of the optical head 20 as shown in FIG. 1. However, the optical apparatus as the second embodiment 30 is different from the optical head 20, in respect of its configuration which is the so-called s-polarized light separation type optical head. In the latter configuration the beam from the semiconductor laser element 31 is reflected on the beam splitter 33 so as to converge on the signal recording surface of a magneto-optical disk D, and the returned beam from the disk D is transmitted by the beam splitter 33 to be guided to the photodetector 38.

The beam splitter 33 has such plural layers forming its reflection plane that the transmittance of a p-polarized light component, Tp, of the incident light is in the range of not less than 85% and not more than 95%.

In this case, when the transmittance of the p-polarized light component, Tp, is less than 85% the level of the reproduction signal decreases thus lowering its quality and deteriorating its precision When the transmittance of the p-polarized light component, Tp, is more than 95%, the influence of the birefringence of the disk D increases noise in the reproduction signal that deteriorates the quality of the reproduction signal. Both circumstances cause an increased block error rate as is the case for optical head 20 in FIG. 1.

In accordance with the optical head 30 having the above configuration, the s-polarized light beam emitted from the semiconductor laser element 31 is separated by the grating 32 into three light beams, and the beams are reflected on the reflection plane 33a of the beam splitter 33. The reflected beams are converted by the collimator lens 34 into parallel beams, and the parallel beams are projected by the object lens 35 to converge onto the signal recording surface of the magneto-optical disk D.

The returned beam from the disk D is incident again on the beam splitter 33 via the collimator lens 34. The beam being a light beam including the magneto-optical signal of the p-polarized light component which is generated such that the converging beam is reflected on the signal recording surface of the magneto-optical disk D, and the polarization plane is rotated based on Kerr effects. In the beam splitter 33, the returned beam is incident on the plural layers formed the half mirror surface 33a, by which the p-polarized light component thereof is transmitted, on which the s-polarized light component is reflected.

When the p-polarized light component is transmitted, the transmittance of the p-polarized light component, Tp, is expressed by the following relation:

$$85\% < Tp < 95\%.$$

Therefore, the returned beam transmitted by the half mirror plane 33a of the beam splitter 33 becomes relatively high in its signal level.

The p-polarized light component transmitted by the beam splitter 33 is polarized by the Wollaston polarizing prism so as to be separated into three light beams, namely, the p-polarized light component, the s-polarized light component, and a servo-component. The separated beams are projected by the multilens unit 37 to the corresponding photoreceptors of the photodetector 38, the separated beams being influenced by the multi-lens unit such that the focussing error component is magnified. Thereby, in accordance with the detection signals from the respective photoreceptors of the photodetector 38, the magneto-optical signal of the magneto-optical disk D, the focussing error signal, and the servo-signal of the tracking error signal are generated.

Although in the second embodiment the semiconductor laser element is used as the laser source as described above, another type of laser source may be used, further the laser source and the photoreceptors (photodetector) may be incorporated with each other.

On the other hand, the plural layers forming the half mirror planes 23a and 33a in the beam splitter 23 and 33 are formed by not only vacuum deposition but by other methods such as sputtering, ion plating, or ion-assisted deposition.

As described in the foregoing, in accordance with the present invention, the high quality reproduction signal is generated, and is detected with high precision.

Thereby, the reproduction signal which includes reduced noise and increased stability is generated, and the arrangement of the parallel optical system is relatively short to enable the whole optical head to be small-sized.

What is claimed is:

1. An optical head for recording and/or reproducing information signals by projecting a light beam from a light source so as to converge onto the signal recording surface of a magneto-optical recording medium, said optical head comprising:

said light source for emitting said beam;

an object lens by which said beam from said light source is projected so as to converge onto said magneto-optical recording medium;

a beam splitter disposed along an optical path between said light source and said object lens, for separating said beam as a divergent beam emitted from said light source and a first polarized light component or a second polarized light component different therefrom of a convergent light beam returned from the signal recording surface of said magneto-optical recording medium, via said object lens, wherein said beam splitter includes two glass blocks stuck to each other, a contact plane of adjacent surfaces of said glass blocks functions as a half mirror at an incline of 45° with respect to the optical axis, and between the adjacent surfaces of said beam splitter are plural layers of titanium oxide ($TiO_2$), silicon oxide ($SiO_2$), silicon (Si), and chromium (Cr); and a photodetector for receiving said returned beam separated by said beam splitter, wherein the separation rate of said first component or said second component by said beam splitter is not less than 85% and not more than 95%.

2. An optical head according to claim 1, wherein said beam splitter separates said first component by transmitting said first component from said beam returned from the signal recording surface of said magneto-optical recording medium via said object lens, and the reflectance of said second component by said beam splitter, Rs, is in the following range:

$$85\% < Rs < 95\%.$$

3. An optical head according to claim 1, wherein said beam splitter separates said second component by reflecting said second component from said beam returned from the signal recording surface of said magneto-optical recording medium via said object lens, and the transmittance of said first component by said beam splitter, Tp, is in the following range:

$$85\% < Tp < 95\%.$$

4. An optical head according to claim 1, wherein the $TiO_2$ layer is 49.19 nm thick, the $SiO_2$ layer is 287.55 nm thick, the Si layer is 44.29 nm thick, and the Cr layer is 4.00 nm thick.

5. An optical head for recording and/or reproducing information signals by projecting a light beam from a light so as to converge onto the signal recording surface of a magneto-optical recording medium, said optical head comprising:

said light source for emitting said beam;

an object lens by which said beam from said light source is projected so as to converge onto said magneto-optical recording medium;

a beam splitter disposed along an optical path between said light source and said object lens, for separating said beam as a divergent beam emitted from said light source, and a first polarized light component by transmitting said first component and a second polarized light component by reflecting said second component from a convergent light beam returned from the signal surface of said magneto-optical recording medium via said object lens, wherein said beam splitter includes two glass blocks stuck to each other, a contact plane of adjacent surfaces of said glass blocks functions as a half mirror at an incline of 45° with respect to the optical axis, and between the adjacent surfaces of said beam splitter are plural layers of titanium oxide ($TiO_2$), silicon oxide ($SiO_2$), silicon (Si), and chromium (Cr); and a photodetector for receiving said returned beam separated by said beam splitter, wherein the reflectance of said second component by said beam splatter, Rs, is in the following range:

$$85\% < Rs < 95\%.$$

6. An optical head according to claim 5, wherein the $TiO_2$ layer is 49.19 nm thick, the $SiO_2$ is 287.5 nm thick, the Si layer is 44.29 nm thick, and the Cr layer is 4.00 nm thick.

* * * * *